US006679510B2

(12) United States Patent
Perena

(10) Patent No.: US 6,679,510 B2
(45) Date of Patent: Jan. 20, 2004

(54) WALKING ASSISTANCE DEVICE

(76) Inventor: Max C. Perena, 12505 SW. 148$^{th}$ St., Vashon, WA (US) 98070-3724

(*) Notice: Subject to any disclaimer, the term of this patent is extended or adjusted under 35 U.S.C. 154(b) by 10 days.

(21) Appl. No.: 10/055,330

(22) Filed: Jan. 25, 2002

(65) Prior Publication Data

US 2003/0141691 A1 Jul. 31, 2003

(51) Int. Cl.$^7$ .......... B62M 1/99

(52) U.S. Cl. .......... 280/250.1; 280/304.1; 5/86.1

(58) Field of Search .......... 280/250.1, 304.1, 280/650; 5/81.1, 86.1

(56) References Cited

U.S. PATENT DOCUMENTS

| | | | | | |
|---|---|---|---|---|---|
| 4,111,445 | A | | 9/1978 | Haibeck | 280/79.3 |
| 4,164,350 | A | | 8/1979 | Zeijdel et al. | 272/70 |
| 4,188,966 | A | | 2/1980 | Palmer et al. | 135/67 |
| 4,211,426 | A | | 7/1980 | Motloch | 280/87.02 |
| 4,226,413 | A | | 10/1980 | Daugherty | 272/70.4 |
| 4,252,063 | A | | 2/1981 | Brooks, Jr. | 104/89 |
| 4,307,715 | A | | 12/1981 | Fante | 128/80 G |
| 4,312,505 | A | | 1/1982 | Engelhart | 272/70.3 |
| 4,911,426 | A | | 3/1990 | Scales | 272/70 |
| 4,981,307 | A | | 1/1991 | Walsh | 280/290 |
| 4,999,862 | A | * | 3/1991 | Hefty | 5/87.1 |
| 5,165,123 | A | * | 11/1992 | Colpron | 5/83.1 |
| 5,190,507 | A | | 3/1993 | Iijima | 482/69 |
| 5,224,721 | A | | 7/1993 | Santmann | 280/87.051 |
| 5,275,426 | A | | 1/1994 | Tankersley | 280/87.051 |
| 5,333,333 | A | * | 8/1994 | Mah | 5/87.1 |
| 5,378,215 | A | | 1/1995 | Harkins | 482/67 |
| 5,379,468 | A | * | 1/1995 | Cassidy et al. | 5/86.1 |
| 5,380,262 | A | | 1/1995 | Austin | 482/68 |
| 5,388,289 | A | * | 2/1995 | Casperson | 5/86.1 |
| 5,451,193 | A | | 9/1995 | Pickard | 482/68 |
| 5,458,550 | A | | 10/1995 | Braim et al. | 482/69 |
| 5,476,432 | A | | 12/1995 | Dickens | 428/67 |
| 5,502,851 | A | | 4/1996 | Costello | 5/86.1 |
| 5,526,893 | A | | 6/1996 | Higer | 180/65.1 |
| 5,676,388 | A | | 10/1997 | Bertani | 280/87.041 |
| 5,702,326 | A | | 12/1997 | Renteria | 482/68 |
| 5,732,964 | A | | 3/1998 | Durham et al. | 280/266 |
| 6,050,582 | A | * | 4/2000 | Horacek | 280/250.1 |

* cited by examiner

*Primary Examiner*—Lesley D. Morris
*Assistant Examiner*—L. Lum
(74) *Attorney, Agent, or Firm*—Richard L. Huff

(57) ABSTRACT

An ambulatory device having a frame having support rails, two large rear wheels containing hand grasps, two small front wheels for steering, a foldable seat allowing the user to sit when desirable, and a height-adjustable support frame having a vertical and horizontal section rising from the frame. A body halter holding the user is optionally rotatably supported by a horizontal support bar which is connected by connector ropes or cables to a T-shaped support bar. Alternatively, the body halter is directly connected to connector ropes which pass by pulleys or through horizontal tubular sections to attach to a scale. The support frame is made height adjustable by a winch or a hydraulic system.

12 Claims, 7 Drawing Sheets

WALKING ASSISTANCE DEVICE

BACKGROUND OF THE INVENTION

1. Field of the Invention

This invention is directed to a device which allows individuals who are unable to stand and ambulate independently to walk without assistance.

2. Description of the Related Art

The prior art is replete with patents relating to the special need of handicapped persons relating to their need for ambulation.

U.S. Pat. No. 4,111,445 discloses a body-restraining device which comprises, a frame, casters, a platform, and restraining straps which allows a paraplegic individual to be in the upright position and to stand for periods of time. This device does not permit a user to walk and requires the help of others to move the device.

U.S. Pat. No. 4,164,350 discloses a device designed to lessen the load borne by a person's legs during a walking exercise. In this device, a seat ring is suspended by a cable from a trolley connected to an overhead track. This device does not allow the user to move about freely and no provision is made for sitting in a wheelchair and propelling the chair with one's arms.

U.S. Pat. No. 4,188,966 discloses a wheeled walker which contains a T-shaped seat bar, a restraint strap for the user's torso, and a restraint mechanism for the user's head. The device lacks any mechanism for propulsion while the user is seated. While the user is seated, the full weight of the user rests on an uncomfortable seat as the head and torso restraints serve only to restrain, not support, the body.

U.S. Pat. No. 4,211,426 discloses a weight-relieving ambulatory device. This device contains wheels, a support frame behind the user, and straps to support the weight of the user. This device does not allow the user to sit.

U.S. Pat. No. 4,226,413 discloses a wheeled walker which contains supports which fit under the armpits of the user. Any locomotion must be in the form of walking and the user must be upright at all times.

U.S. Pat. No. 4,252,063 discloses a walking device in which an overhead horizontal rail holds a track carriage which traverses the rail. A restraining vest is held by the track carriage and is adapted to support the body of a user. This device prevents freedom of motion of the user and does not allow for movement in a wheelchair propelled by arm power.

U.S. Pat. No. 4,307,715 discloses an ambulatory aid for users who are using the conventional physical therapy walker railings in hospitals. The device contains three wheels, a front support handle, and a brace having straps to hold the user to the brace. This device limits the mobility of the user to the walker railings and does not allow the user to sit.

U.S. Pat. No. 4,312,505 discloses a wheeled walker which contains supports for the arms and a support belt which is suspended from a rear frame. No provision is made for the user to sit and all locomotion must be in the form of walking.

U.S. Pat. No. 4,911,426 discloses a fixed overhead rail holding rollers connected to a pulley system which supports an upper body support system. The user is held within the support system, which lessens the weight borne by the legs during walking. This device is for exercise in a limited area, and does not allow for freedom of movement by the user. No provision is made for the user to sit in a wheelchair and travel by his or her arm power.

U.S. Pat. No. 4,981,307 discloses a wheelchair for persons who cannot walk. The device contains a supporting harness to help suspend some of the body weight and relieve pressure from the buttocks. This device is not designed to allow the user to walk or stand.

U.S. Pat. No. 5,190,507 discloses a circular handrail which surrounds a rotating upright support which supports a horizontal arm. A user support system is suspended from the horizontal arm, allowing the user to move only in a path following the circular handrail. No freedom of movement is intended. No seat is provided. No independent movement via a wheelchair is contemplated.

U.S. Pat. No. 5,224,721 discloses a wheeled walker which contains a seat which may be folded out of the way to allow the user to walk or folded down to allow the user to sit. No provision is made for supporting the weight of the user while walking.

U.S. Pat. No. 5,275,426 discloses a wheeled walker containing an attachable body support for lessening the body weight needed to be supported by the user. The body support is made of rigid plastic and fits around the chest of the user. No provision is made for sitting and using arm power to propel the device.

U.S. Pat. No. 5,378,215 discloses a wheeled walker which contains a seat, side rails, and available crutch supports. This device provides no means other than the rails for supporting the weight of the user while walking.

U.S. Pat. No. 5,380,262 discloses a wheeled walker having a seat available and supports which fit under the armpits of a user. Other than the crutch supports, there is no means to support the user's weight while walking.

U.S. Pat. No. 5,451,193 discloses a combination wheelchair and walker. This device contains wheels, a frame having handle rails, and a seat. While walking, the user can rely only on the handle rails for support.

U.S. Pat. No. 5,458,550 discloses a child walker system which comprises a seat to support the weight of the child. The seat is attached by straps and a spring to a moveable roller assembly which traverses a track. No provision is contemplated for a wheelchair allowing the user to move about freely under his or her power. It would be against the intent of the owners of this system to allow complete freedom of movement of the device.

U.S. Pat. No. 5,476,432 discloses a wheeled walker that has a support frame to surround and support the user. The user must stand at all times as there is no provision for sitting and the weight of the user must be supported by the arms or legs.

U.S. Pat. No. 5,502,851 discloses a lifting and walking device which contains an adjustable wheeled frame, a hydraulic lifting mechanism including a pair of adjustable L-shaped lifting yoke arms, and a full-body harness. The device does not allow the user to sit and does not provide for a wheelchair which can be propelled by the user.

U.S. Pat. No. 5,526,893 discloses a wheeled walker which contains wheels, a hand support rail, and an adjustable sling assembly for supporting the user's weight. In this device all power for motivation must be provided by the legs unlike a wheelchair where the power is provided by the user's arms.

U.S. Pat. No. 5,676,388 discloses a wheeled walker having wheels, a seat, hand supports, and armpit supports. While seated, the user cannot propel the device.

U.S. Pat. No. 5,702,326 discloses a wheeled walker which has wheels a seat, and hand bars. This device cannot be powered by hand and must be moved by the power provided by walking.

U.S. Pat. No. 5,732,964 discloses a wheeled walking apparatus having wheels, a frame, a seat, and a torso support. This device can only be propelled when the user is walking and cannot be moved by hand power of the user. No provision is made for supporting the weight of the user.

In spite of the plethora of devices for aiding the mobility of handicapped persons, there is no record of a device which will allow ambulation of a user having at least some of his or her weight supported by an overhead support which is attached to the ambulatory device in combination with a fold-away seat which allows the user to rest and hand-powered wheels which allow the user to be propelled by hand power.

SUMMARY OF THE INVENTION

The present invention provides a device which allows individuals to stand and ambulate independently while any desired degree of their body weight is supported in a body halter as well as sit and propel a wheelchair.

The device comprises a frame holding a hand rail, two large rear wheels which allow the user to propel the device by hand, two small front wheels which allow the user to steer the device by shifting his or her weight in the desired direction, a vertical support rising from the rear end of the frame which holds a horizontal support bar, a body halter for allowing support of the user's body weight, and a winch mechanism connected to the halter by connecting ropes or cables allowing the user to be hoisted and supported to any full or partial weight-bearing degree. The vertical support may be prepared from telescopic tubing to allow for adjusting the height of the vertical support. A hydraulic cylinder may be used to raise and lower the vertical support. An overhead swivel allows the user to turn in any direction while within the device, thus allowing entrance and exit facing either the front or rear of the device. The device comprises a fold-away seat which allows the user to rest and to propel the device by hand power applied to the rear wheels.

DESCRIPTION OF THE PREFERRED EMBODIMENTS

Figure 1:
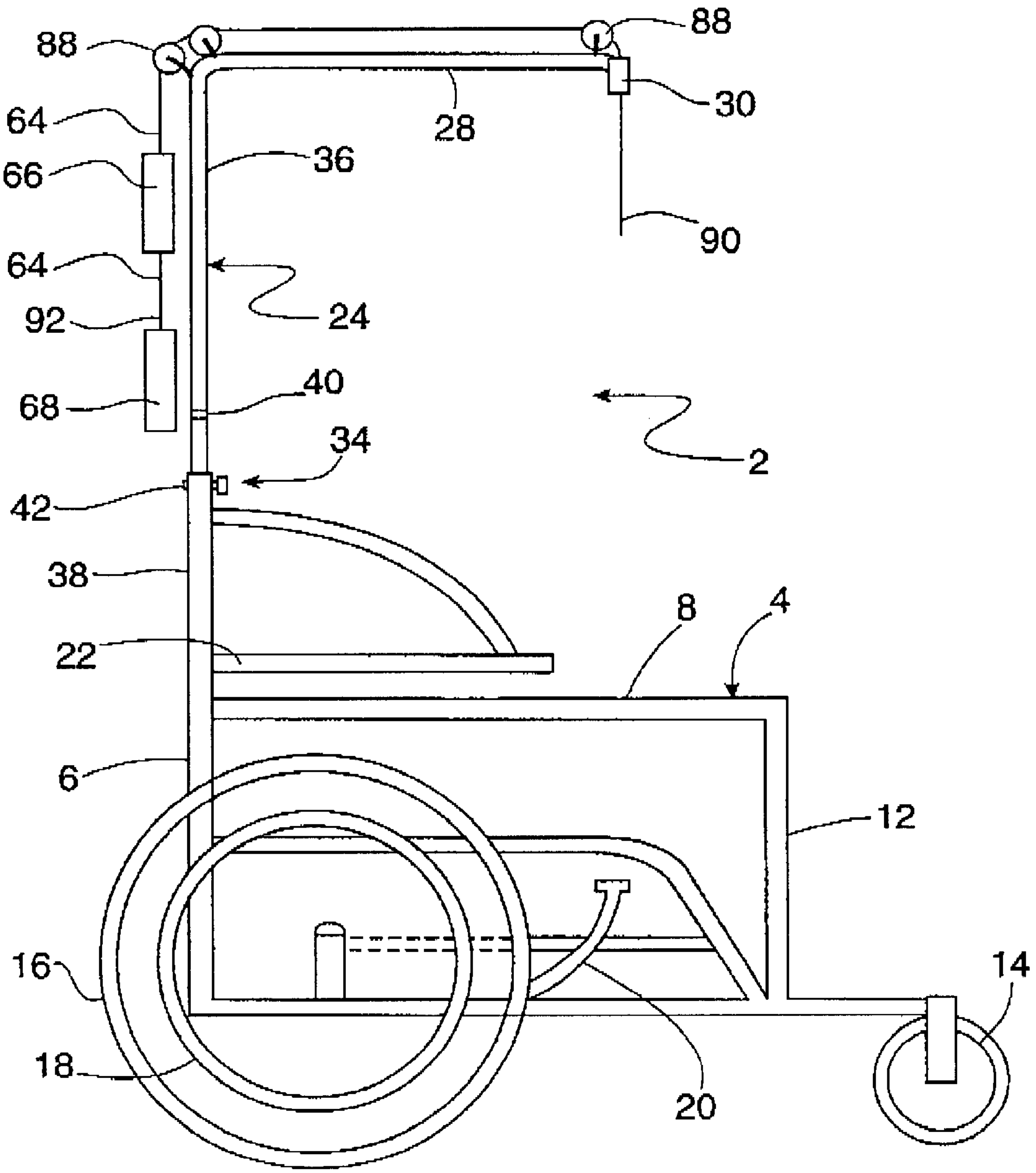
FIG. 1 is a side elevational view of a device of this invention.
Figure 2:
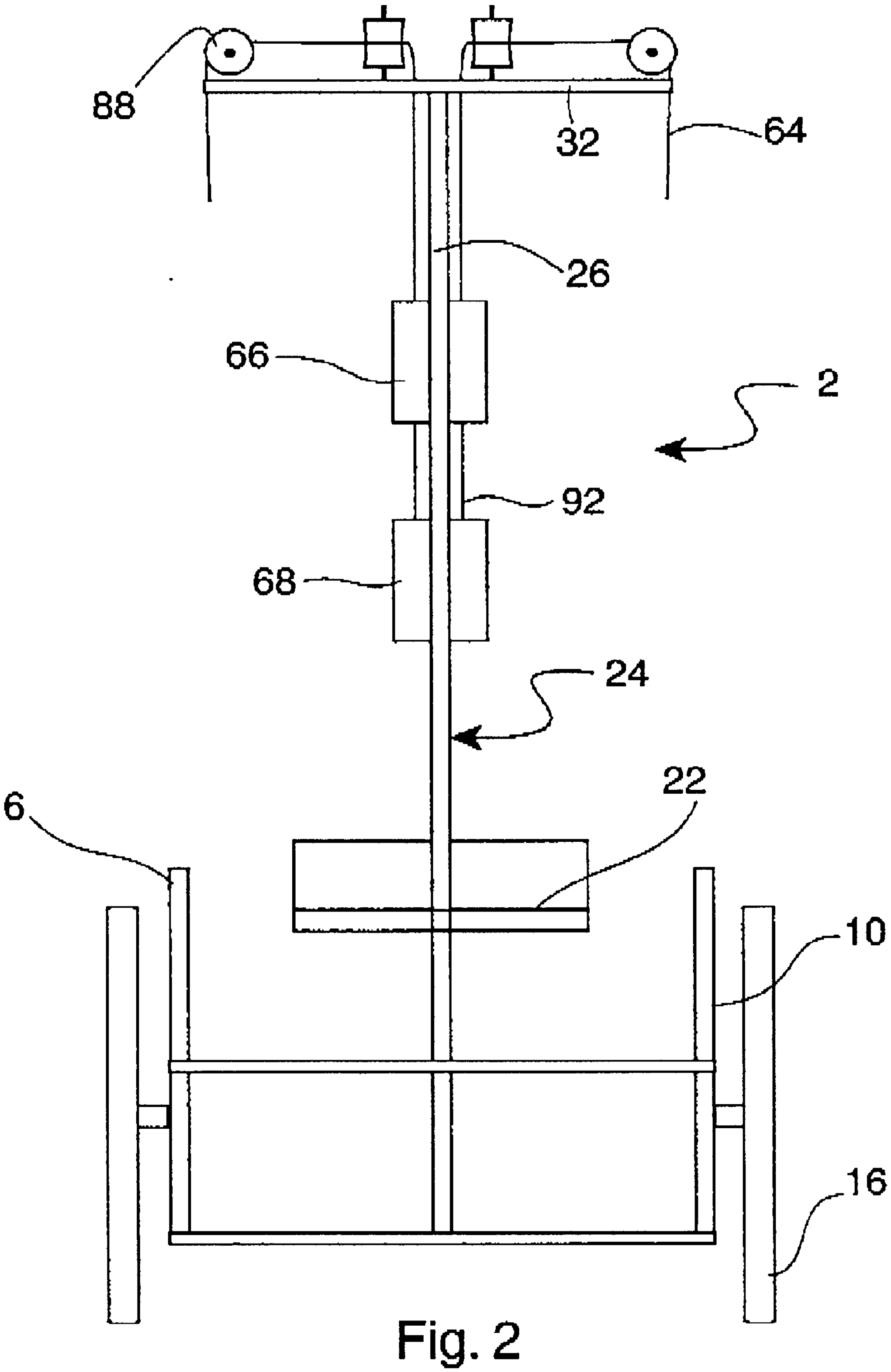
FIG. 2 is a rear elevational view of the device.

The preferred embodiments of the present invention will now be described with reference to the above drawing, like numerals referring to like parts throughout the description.

The device 2 of the present invention is made up of several individual parts which will be described in detail below.

With reference to FIGS. 1, 2, and 5–7, the user sits or stands inside a U-shaped frame 4. The frame 4 has a closed rear end 6, hand rails 8 along each of the sides 10 for aid in supporting the user, and an open front end 12. Preferably, the frame 4 is made of light metal tubing, such as aluminum. However the particular material is not critical.

Two small swivel wheels or casters 14 are attached to the front end 12 of the frame 4. These wheels 14 are such that they turn in the direction toward which the user leans while the user is standing.

Two large wheelchair wheels 16 are attached to the rear end 6 of the frame 4. These wheels 16 preferably provide hand grasps 18 for those times when the user wishes to propel the device 2 from a seated position. A conventional brake 20 is also attached to at least one of the rear wheels 16 so that the device 2 may be set in place while the user changes positions. Preferably, the device 2 is equipped with the wheelchair dynamic braking system (not shown) disclosed in U.S. Pat. No. 5,845,746 to Henrickson et al so as to enable the user to rest while either standing or seated when the device is heading up an incline.

A seat 22 is provided at the rear end 6 of the frame 4. Preferably, the seat 22 is foldable so as to provide the user with the entire area of the device 2 while standing.

A support frame 24 is attached to the rear end 6 of the U-shaped frame 4. The support frame 24 has a vertical section 26 rising from the rear end 6 of the U-shaped frame 4 and a horizontal section 28 extending over the interior of the U-shaped frame 4. In a first embodiment, the front end 30 of the horizontal section 28 ends in a horizontal T-shaped support bar 32. In a second embodiment, the support frame 24 is made of two separate tubular vertical 26 and horizontal 28 pieces joined together.

Figure 5:
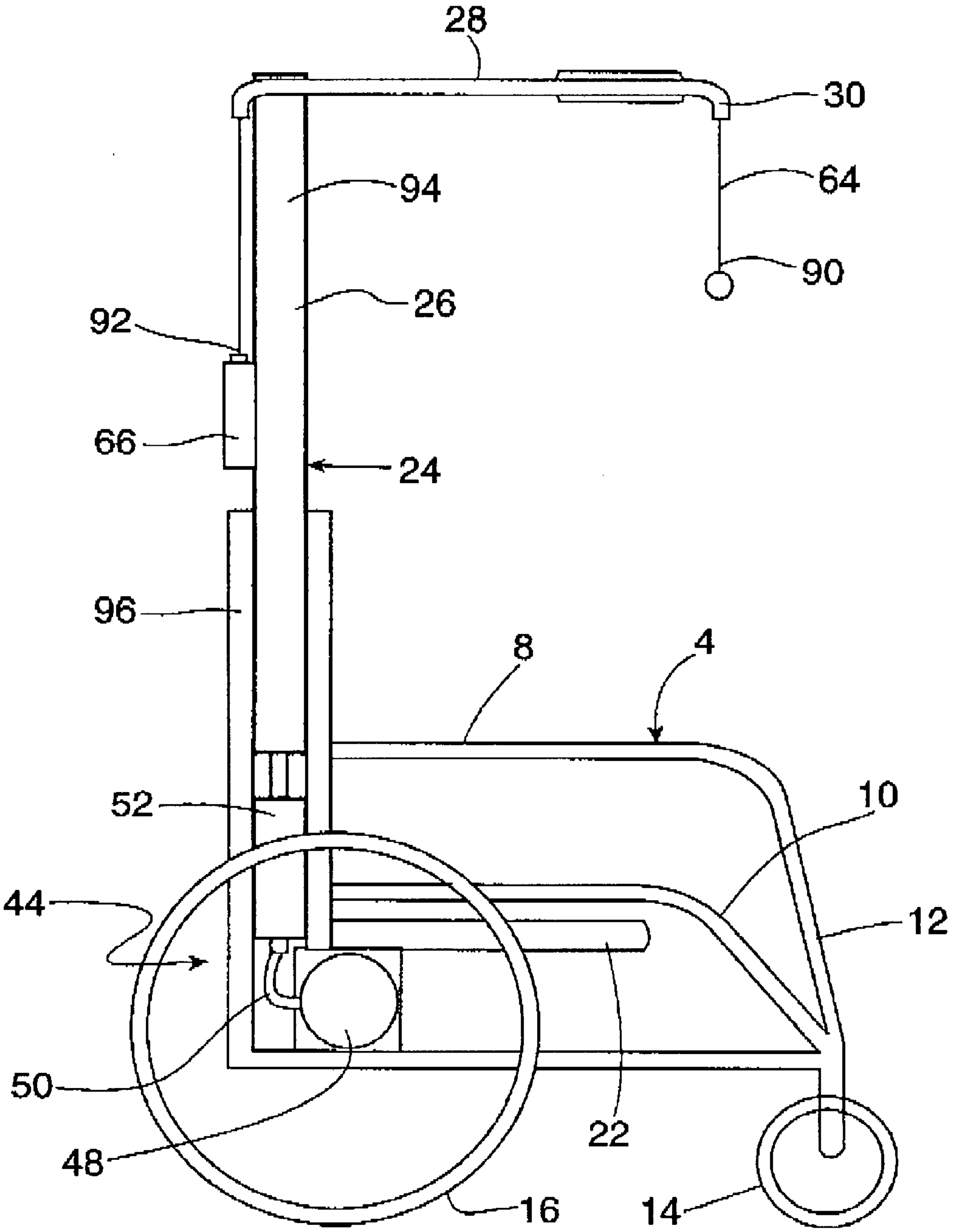
FIG. 5 is a side elevational view of an embodiment of this invention which contains a hydraulic lift for the vertical support and the rope passes through a closed tube rather than along a pulley system.
Figure 6:
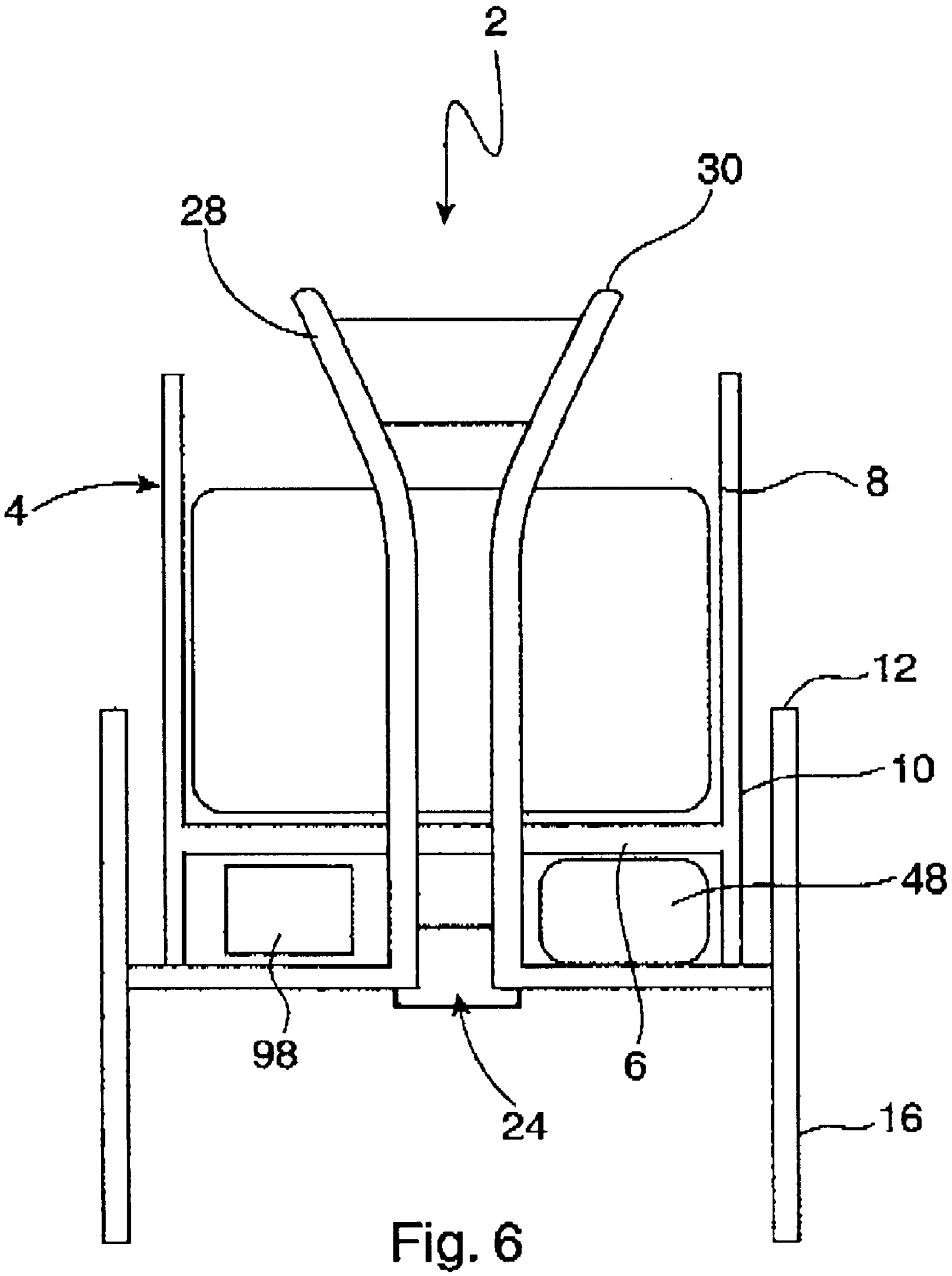
FIG. 6 is a plan view of the embodiment displayed by FIG. 5.
Figure 7:
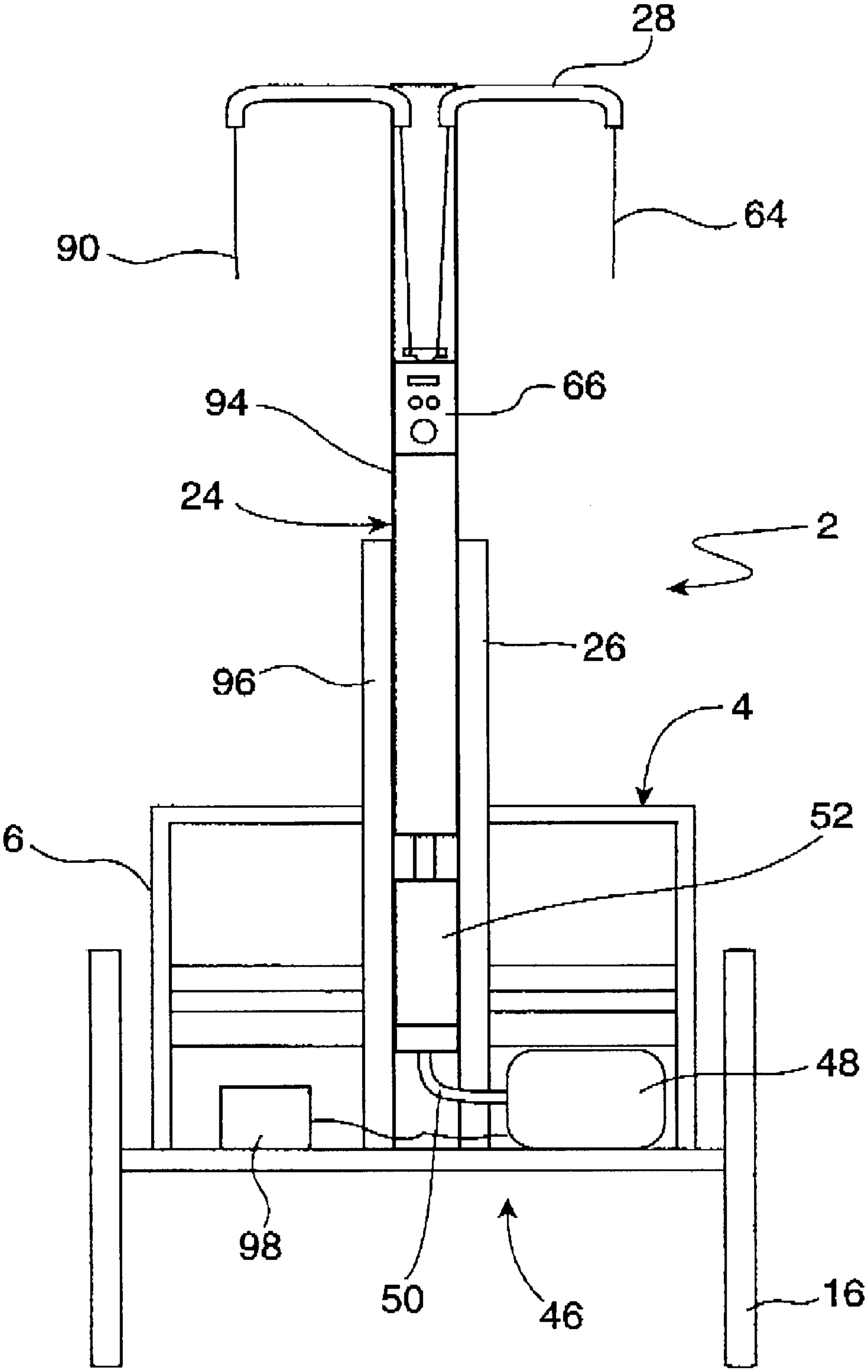
FIG. 7 is a rear elevational view of the device, detailing the hydraulic power unit.

In a first embodiment, the vertical section 26 contains a height-adjusting mechanism 34 made of an inner 36 and outer 38 piece of telescopic tubing which may be reversibly locked in place with, for example, bolt 40 and hole 42 means or spring-loaded ball and hole means (not shown). The height-adjusting mechanism 34 allows the device 2 to be shortened to pass through doorways. In a second embodiment, as shown in FIGS. 5–7, the height-adjusting mechanism 44 is a hydraulic system comprising a hydraulic lift unit 46 having a reservoir 48, a hose 50, and a hydraulic cylinder 52. When this system 44 is used, the height of the vertical section 26 may be easily adjusted and locked in place.

Figure 3:
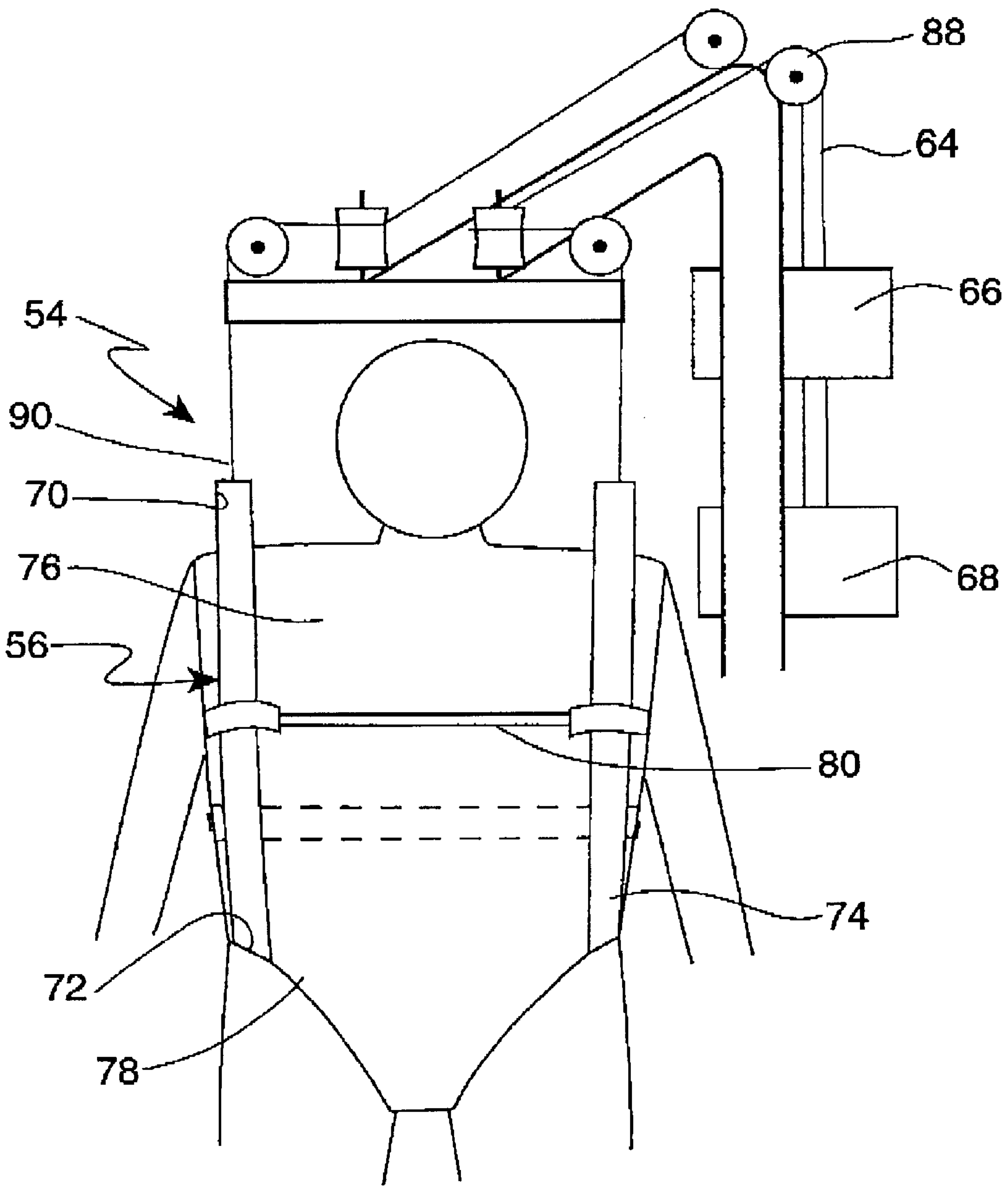
FIG. 3 is a front elevational view of the halter and supporting apparatus.
Figure 4:
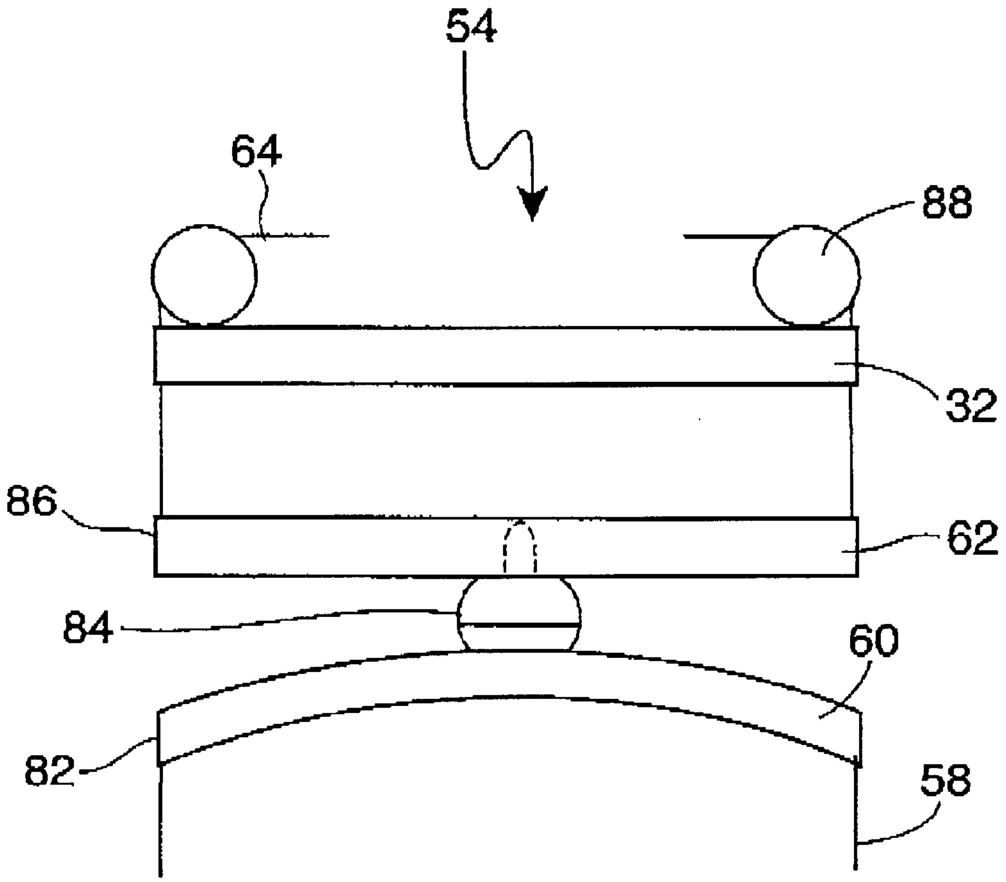
FIG. 4 is a front elevational view of the swivel system for the halter.

In a first embodiment, a support system 54 as shown in FIGS. 3 and 4 comprises a body halter 56, connectors 58, a swivel support 60, a horizontal support bar 62, a support frame 24, control connectors 64, an optional electronic scale 66, and a winch 68.

In a second embodiment show in FIGS. 5–7, the support system 54 comprises a body halter 56, control connectors 64, and an electronic scale 66.

With reference to FIG. 3, a body halter 56 attaches to the user so that, when the halter 56 is assembled, the arms and legs of the user pass through upper 70 and lower 72 holes in the body halter 56. Straps 74 which are attached to both the front 76 and rear (not shown) of the halter 56 at the lower end 78 and thorax section 80 of the halter 56, extend above the halter 56.

With reference to FIG. 4, the straps 74 of the body halter 56 are removably attached to connectors 58 made of ropes or cables which connect the body halter 56 to a swivel support 60. The swivel support 60 holds the connectors 58 at the outer ends 82 thereof and contains a swivel device 84 in the center. The swivel device 84 is connected to the center of a horizontal support bar 62. This allows the user to easily turn in any direction while inside the U-shaped frame 4 and, if the connectors 58 are extended, approach the U-shaped frame 4 facing in any direction while wearing the halter 56.

Each end 86 of the horizontal support bar 62 is connected to a control connector 64. Each control connector 64, which may be a rope or cable, goes from the end 86 of the horizontal support bar 62 over a series of pulleys 88 to an electrically or manually controlled winch 68 located at the rear 6 of the device 2 on the vertical section 26 of the support frame 24.

In a desirable option, an electronic scale 66 is placed above the winch 68 so that the amount of weight which is being supported by the support system 54 may be measured and controlled.

In a second embodiment as shown in FIGS. 5–7, as a desirable alternative to the combination of the winch 68, pulley system 88, and horizontal support bar 62 just described, the straps 74 of the body halter 56 may be removably and directly attached to a distal end 90 of a control connector 64 rope or cable which passes through a tubular horizontal 28 section of the support frame 24. The proximal end 92 of the control connector 64 is attached to the electronic scale 66 to allow the determination of the amount of the patient's weight which is being supported by the control connector. The raising and lowering of the vertical section 26 varies the amount of the user's weight which is being supported and permits the adjustment of the height of the device 2 to allow for passing through doorways. The support fame 24 is made up of an inner, upper vertical section 94 and an outer, lower vertical section 96. The upper section 94 is moved vertically within the lower section 96 by action of the hydraulic system 44.

In operation, there are a variety of ways for the user to enter the device 2. In the first alternative, the user, wearing the body halter 56, may approach the device 2 in a wheelchair, couple the connectors 58 or the distal ends 90 of the control connectors 64 to the straps 74 of the halter 56 while outside the device 2, and adjust the winch 68 or hydraulic system 44 so that the desired length of control connector 64 is available. The device 2 may then be entered from the front 12 with the user facing any direction. In the second alternative, the user enters the device 2 from the front 12 in a wheelchair facing the rear 6 of the device 2. The halter 56 is then applied and the user is hoisted up and turned around. The wheelchair is then removed. In a third alternative, the user in a wheelchair backs into the device 2. The user is then stood up and the halter 56 is applied. The wheelchair is then removed.

With reference again to FIG. 1, if the user possesses sufficient leg strength, the device 2 may be propelled by leg strength with any desired amount of the body weight being supported by the support system 24. When passing through doorways or other areas which are lower than the fully extended device, the vertical section 26 of the support frame 24 may be shortened by means of the height-adjusting mechanism 34 on the vertical section 26 of the support frame 24. At any desired time, the user may bring the seat 22 to the sitting position and sit. The device contains hand grasps 18 on the large rear wheels 16 allowing the user to propel the device 2 by hand. The brake 20 may be applied for those times when the user is changing position from sitting to standing or standing to sitting or is entering or exiting the device 2.

Another desirable option for the device 2 is a conventional battery 98 located at the rear of the frame 4 to propel the device 2 in those times when the user wishes to move from place to place in a short time.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An ambulatory device comprising a U-shaped frame having a closed rear end, two sides, and an open front end, said U-shaped frame having two small front wheels and two large rear wheels attached thereto, a seat attached to the rear of the U-shaped frame, and a support system attached to the rear end of the U-shaped frame, which support system comprises a support frame having a vertical section and a horizontal section wherein the vertical section of the support frame contains a height-adjusting mechanism and wherein the device further comprises a body halter having straps, which straps are connected by connectors to a swivel bar, which swivel bar is connected to a support bar, and which support bar is connected via control connectors through a pulley system to the height-adjusting mechanism.

2. The ambulatory device of claim 1 wherein the height-adjusting mechanism is a winch on the vertical section of the support frame.

3. The ambulatory device of claim 2 wherein an electronic scale is located above the winch and the electronic scale is connected to the winch and the support bar by control connectors.

4. The ambulatory device of claim 1 wherein the large rear wheels contain hand grasps.

5. The ambulatory device of claim 1 wherein the two sides contain hand rails.

6. The ambulatory device of claim 1 wherein the seat is foldable.

7. The ambulatory device of claim 1 wherein the height-adjusting mechanism is a hydraulic lift.

8. The ambulatory device of claim 7 wherein the support system comprises a support frame having a tubular horizontal section.

9. The ambulatory device of claim 7 wherein the straps attached to the body halter are connected by control connectors passing through the horizontal section of the support frame to an electrical scale on the vertical section of the support frame.

10. The ambulatory device of claim 9 wherein the large rear wheels contain hand grasps.

11. The ambulatory device of claim 9 wherein the two sides contain hand rails.

12. The ambulatory device of claim 9 wherein the seat is foldable.

* * * * *